United States Patent
Nicoud

(10) Patent No.: US 11,528,887 B2
(45) Date of Patent: Dec. 20, 2022

(54) AERATED WATERING BOWL FOR SMALL ANIMALS

(71) Applicant: Charles Edward Nicoud, Henrietta, TX (US)

(72) Inventor: Charles Edward Nicoud, Henrietta, TX (US)

( * ) Notice: Subject to any disclaimer, the term of this patent is extended or adjusted under 35 U.S.C. 154(b) by 87 days.

(21) Appl. No.: 16/910,478

(22) Filed: Jun. 24, 2020

(65) Prior Publication Data

US 2021/0400912 A1 Dec. 30, 2021

(51) Int. Cl.
*A01K 7/02* (2006.01)

(52) U.S. Cl.
CPC ..................................... *A01K 7/02* (2013.01)

(58) Field of Classification Search
CPC . A01K 7/00; A01K 7/005; A01K 7/02; A01K 7/022; A01K 7/025; A01K 7/027; A01K 7/04; A01K 7/06; A01K 63/00; A01K 63/003; A01K 63/006; A01K 63/04; A01K 63/042; A01K 63/047; B05B 7/0483; B05B 17/08; B01F 23/231; B01F 23/2311; B01F 23/23113; B01F 23/23121
See application file for complete search history.

(56) References Cited

U.S. PATENT DOCUMENTS

| | | | |
|---|---|---|---|
| 4,038,946 A * | 8/1977 | Leuthesser | A01K 61/00 119/263 |
| 4,197,265 A * | 4/1980 | Burke | F23L 7/005 261/121.1 |
| 2017/0202189 A1* | 7/2017 | Chun | A01K 63/065 |
| 2017/0314280 A1* | 11/2017 | Velet | E04H 4/0031 |

* cited by examiner

*Primary Examiner* — Kristen C Hayes
(74) *Attorney, Agent, or Firm* — Kelly & Kelley, LLP

(57) ABSTRACT

A watering bowl for small animals includes a reservoir having a base and a wall extending from the base to an opening. The wall is tapered between the base and the opening, such that the opening has a diameter that is smaller than the base. The watering bowl includes an air conduit for conveying pressurized air into the reservoir and aerating the water within the reservoir to create a mist that rises to the opening and then onto an outer surface of the watering bowl to create water droplets for drinking.

16 Claims, 5 Drawing Sheets

US 11,528,887 B2

AERATED WATERING BOWL FOR SMALL ANIMALS

BACKGROUND OF THE INVENTION

The present invention generally relates to watering bowls for pets. More particularly, the present invention is directed to an aerated watering bowl for small animals, such as small reptiles and the like.

As herpetologists, reptile and other small pet owners know, many small animals, such as small lizards including chameleons, for example, will not drink from standing water. Instead, these animals will only drink small dew droplets off plants and grass and the like in a natural state. As the small animals will not drink from the standing water, such as in traditional pet bowls and the like, these small animals will often die of dehydration even with a bowl of water in their cage or enclosure.

One common problem with pet watering bowls is that, being shaped as a bowl, the pet when drinking the water will often place a portion of its body upon a lip of the bowl in order to reach into the bowl for water. This can often cause the bowl to tip and for water to spill from the bowl, which can create a mess within the surrounding area of the enclosure. This may even require replacement of fill material within a portion of the enclosure, so as to avoid mold, mildew, and the like.

Another commonly encountered problem with watering bowls and watering devices for small pets is that these small animals drink very little. Therefore, the water has a tendency to stagnate if not changed regularly, sometimes daily. When the water stagnates, it can create mal odors and the small animals may not drink from the stagnated water.

Small insects, such as crickets, are the primary diet of most lizards. Crickets are left in the pet's cage to make them available for feeding at will. Crickets will often approach the source of water, and become trapped in it. The crickets drown and quickly fowl the drinking water for the small animals. This not only creates an inconvenience to the pet owner who needs to change the water on a more frequent basis, but also can be a health hazard to the lizards or other small animals who can be sick or even die from dehydration.

Accordingly, there is a continuing need for a watering bowl for lizards and other small animals in which the water does not stagnate quickly. There is also a continuing need for a watering bowl which prevents crickets and other insects from entering into, drowning, and fowling the water. There is a further need for a watering bowl in which water droplets are provided for drinking by small lizards and other small animals, mimicking a natural state. There is also a need for a watering bowl for small animals which will not easily tip over and spill. The present invention fulfills these needs, and provides other related advantages.

SUMMARY OF THE INVENTION

The present invention generally resides in a watering bowl for small animals. More particularly, the present invention resides in a watering bowl that provides the small animal with easy access to stagnant-free, aerated water. The watering bowl is also designed and configured so as to be substantially spill-proof.

A watering bowl comprising the present invention includes a reservoir having a base and a wall extending from the base to an opening. The wall may be tapered between the base and the opening. The opening may have a diameter that is smaller than the base. For example, the wall may extend upwardly from the base to the opening at an angle between thirty and sixty degrees, and more typically approximately forty-five degrees. The opening may be generally centered over the base. Preferably, an outer surface of the wall is coarse.

The watering bowl also includes an air conduit for conveying pressurized air into the reservoir and aerating the water within the reservoir. The air conduit includes a plurality of spaced apart air outlets formed within the reservoir. The air conduit may include an air nipple extending outwardly, such as from the base of the bowl. The air conduit may be formed integrally with the bowl. The air conduit may be formed in the wall or at a junction between the wall and the base.

When water is placed in the reservoir and pressurized air is applied to the air conduit, the water within the reservoir is aerated to create a mist that rises to the opening of the bowl. The mist may collect on a rim of the opening and/or an outer surface of the bowl such that droplets of water can be accessed and consumed by the small pet.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings, for purposes of illustration, the present invention is directed to a watering bowl 100 for small animals, such as animals that are held in small cages, aquariums, and other enclosures. Such small animals may include small lizards, such as chameleons, or the like. The present invention is particularly useful for small animals, such as small lizards and the like, which drink by lapping droplets of water instead of drinking from standing water. The watering bowl 100 of the present invention provides small pet owners with a water bowl that will allow their pets easy access to spill-proof, stagnant-free, fresh, clean water. The watering bowl 100 of the present invention is also easily maintained and cleaned, and is easy to install and operate with commonly available aquarium accessories available at any pet shop.

Figure 1:
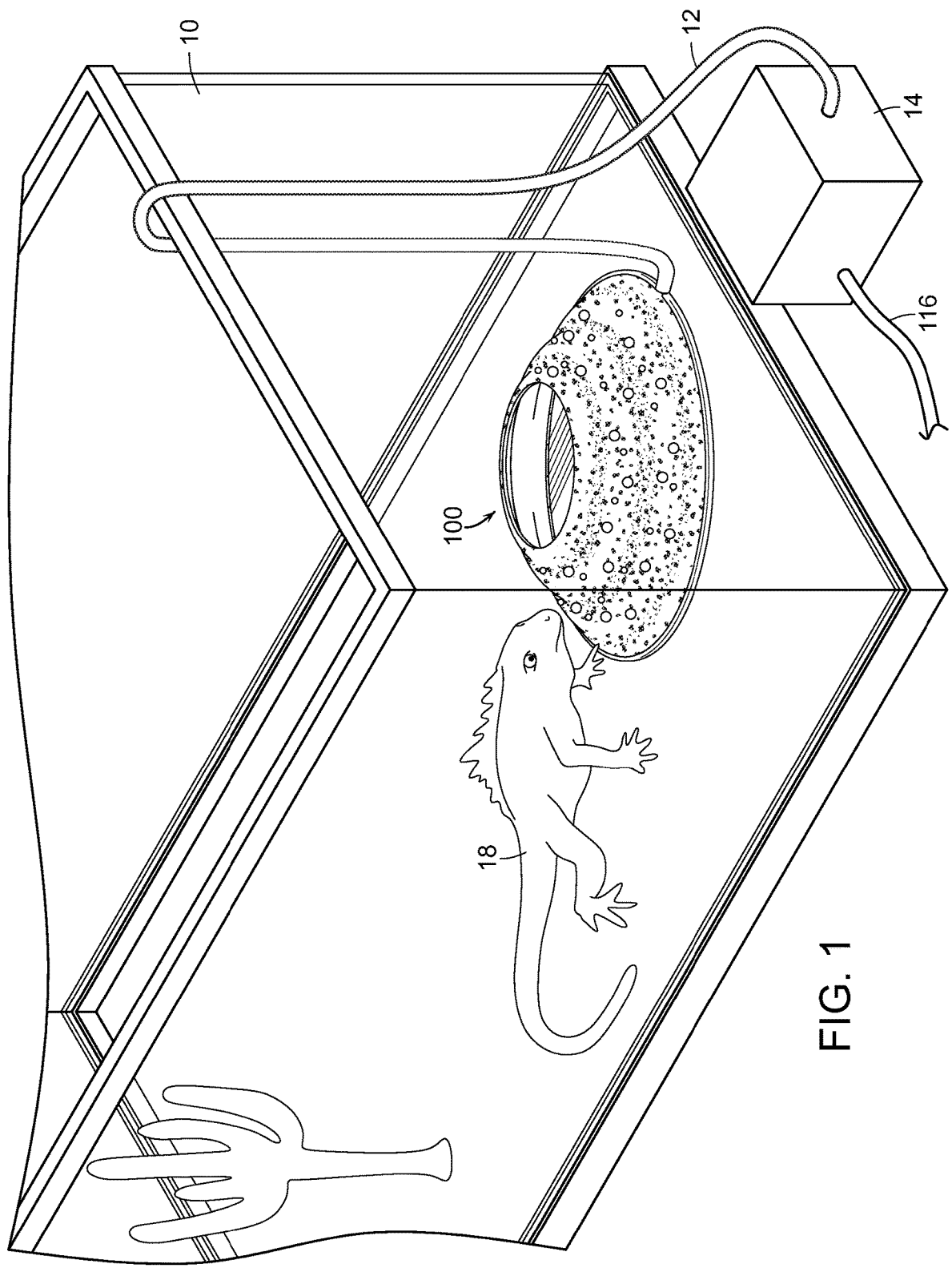
FIG. 1 is a perspective diagrammatic view of a watering bowl embodying the present invention operably connected to a source of pressurized air and placed within a small pet enclosure, in accordance with the present invention.

With reference now to FIG. 1, a watering bowl 100 embodying the present invention is shown disposed within an enclosure 10, such as an empty aquarium tank, while it will be understood that the watering bowl 100 could be used in other cages and enclosures for small pets. An airline 12, such as a common rubber aquarium airline, is operably attached to the watering bowl 100, and an external air source 14, such as a small aquarium pump. The pump 14 has an electrical cord 16 which extends to a wall outlet or other power source. The watering bowl 100 is sized and configured so as to be particularly useful for both the small pet owner as well as the small pets 18, such as small lizards or the like, to obtain fresh, clean water, and also water droplets. The water bowl 100 is designed and configured so as to be substantially spill-proof as well as stagnant-free.

Figure 2:
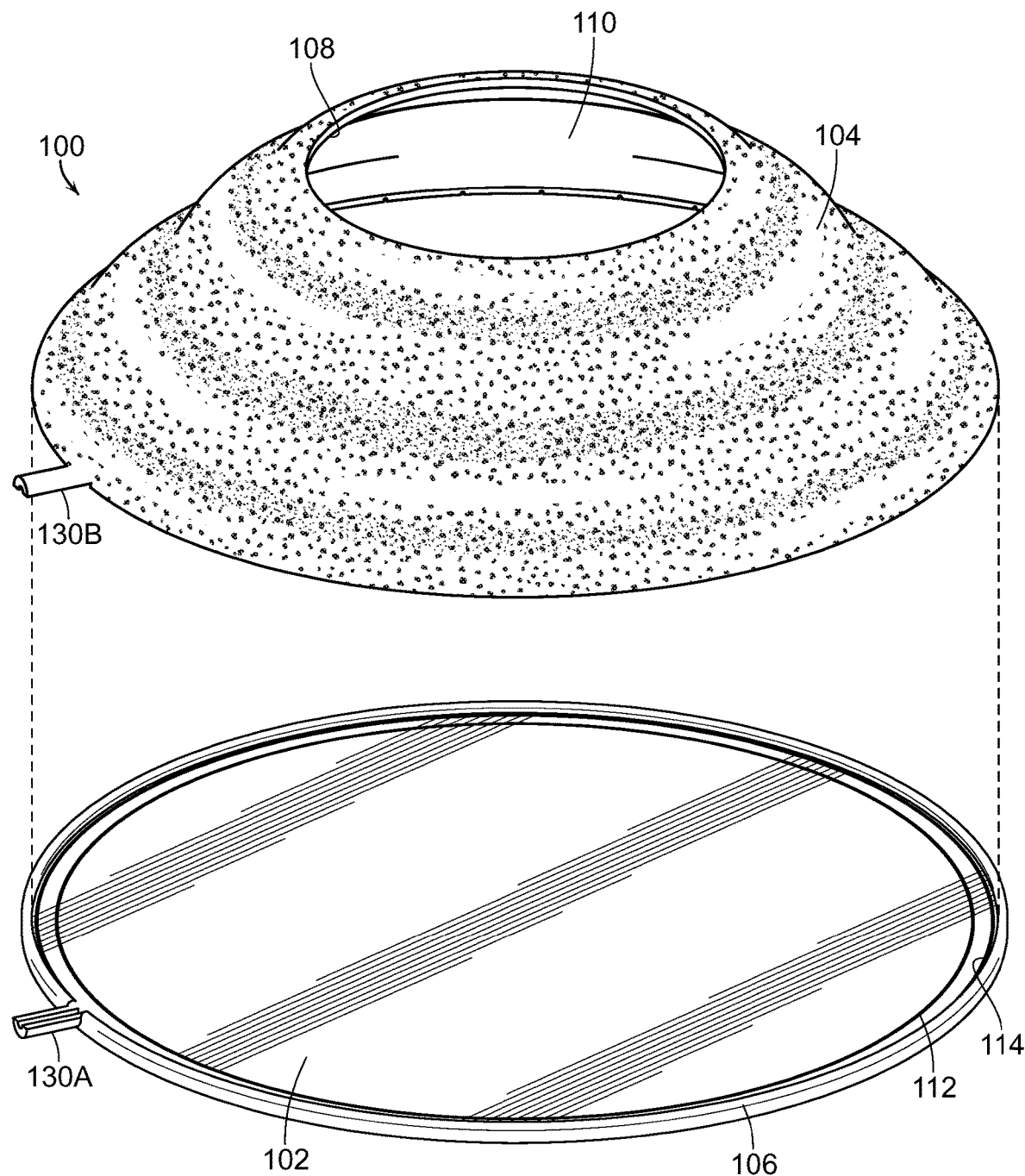
FIG. 2 is an exploded perspective view of a base and a wall comprising the watering bowl.

With reference now to FIG. 2, the watering bowl 100 may be comprised of two pieces, namely, a base 102 and a wall 104 which is connectable to the base. The watering bowl 100 also includes a reservoir, such as being cooperatively formed and defined by the base 102 and the wall 104. It will be understood, however, that the water reservoir may be formed in the base 102. Typically, however, the base 102 is substantially planar for defining a shallow dish, defined by an outer peripheral lip 106.

Figure 5:
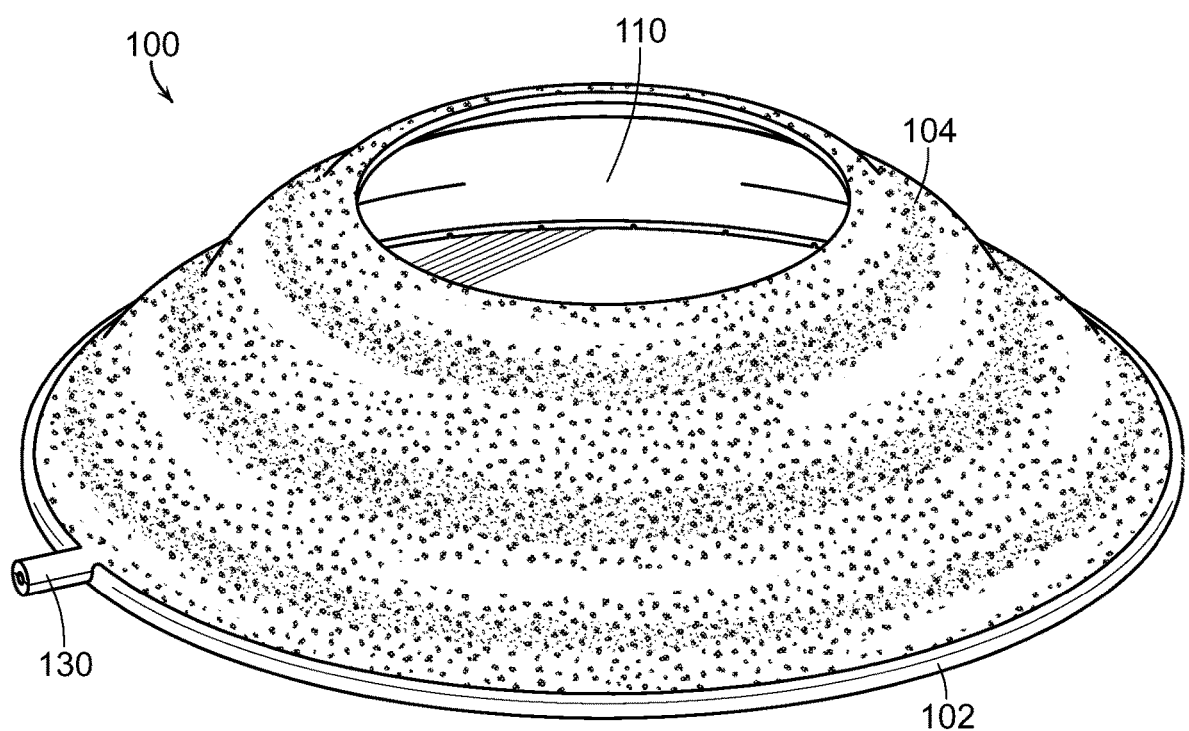
FIG. 5 is a perspective view of the assembled watering bowl embodying the present invention.
Figure 6:
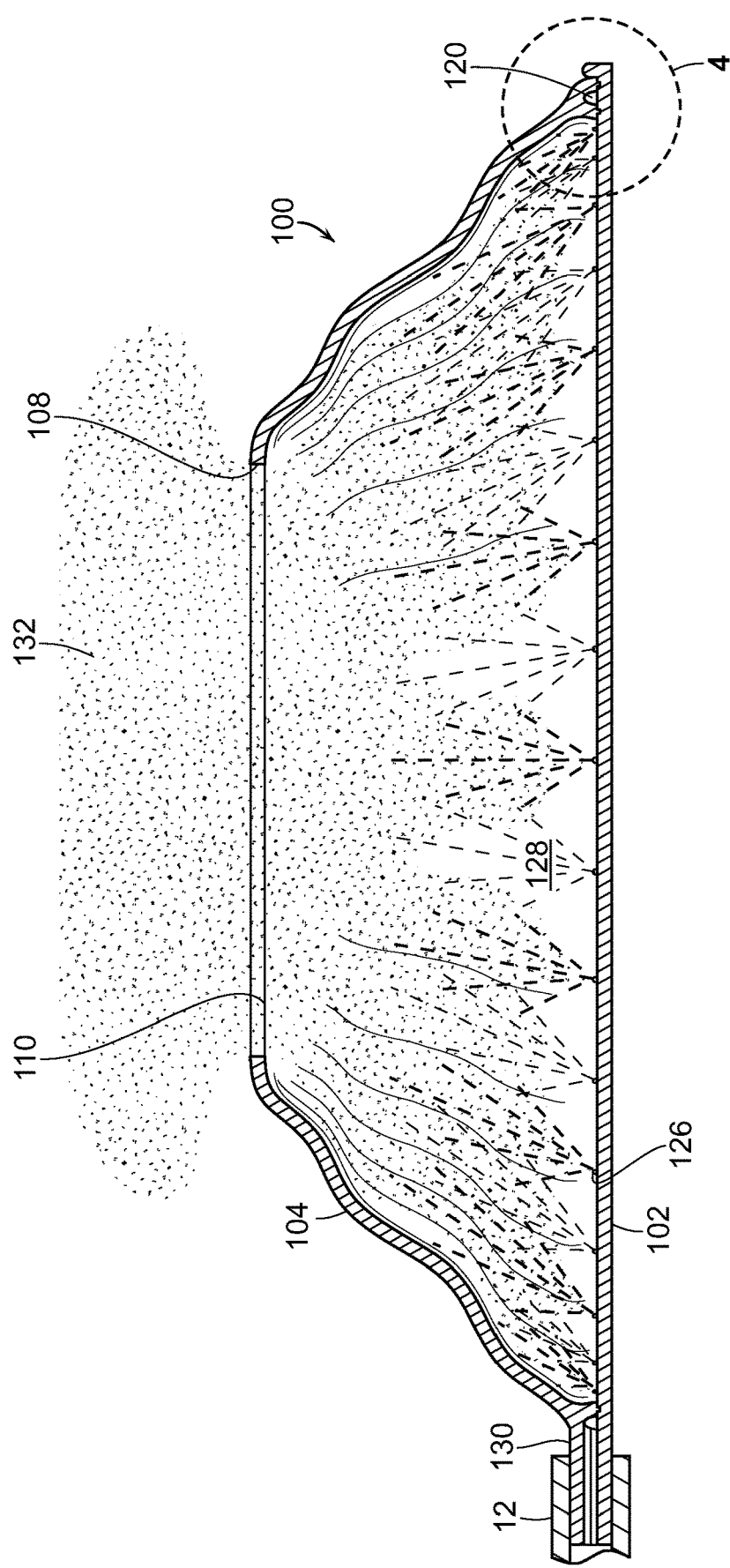
FIG. 6 is a cross-sectional view illustrating water within the watering bowl being aerated to create a mist, in accordance with the present invention.

As shown in FIGS. 2 and 5, the wall 104 is tapered from the base 102 to a rim 108 defining an opening 110. The wall 104 may extend upwardly from the base 102 to the opening 110 at an angle between thirty degrees and sixty degrees, such as approximately forty-five degrees. This achieves various objectives of the present invention, including the ability of small animals, such as small lizards, to climb upon the wall 104. The outer surface of the wall 104 is typically coarse and not smooth, such as having a sand or rocky finish, which also facilitates the lizard or other small pet to climb upon the outer surface of the wall 104 of the bowl 100. The coarse outer surface can also be given the appearance of a rock surface or other surface so as to be aesthetically appealing and desirable to the pet owner. The wall 104 may also be tiered or undulating, as shown in FIG. 6, which also gives it a desirable appearance and assists the lizards and other small pets to climb upon the wall 104.

Figure 3:
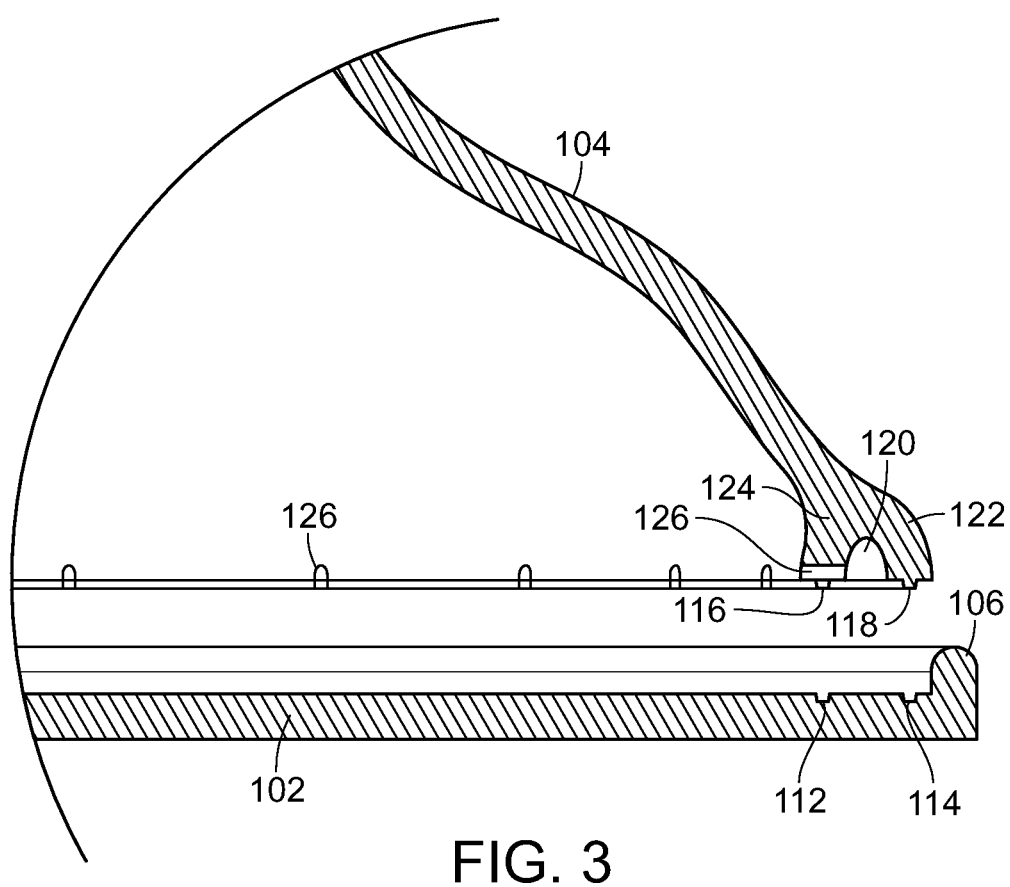
FIG. 3 is a cross-sectional and enlarged view of an outer edge of the base and wall.
Figure 4:
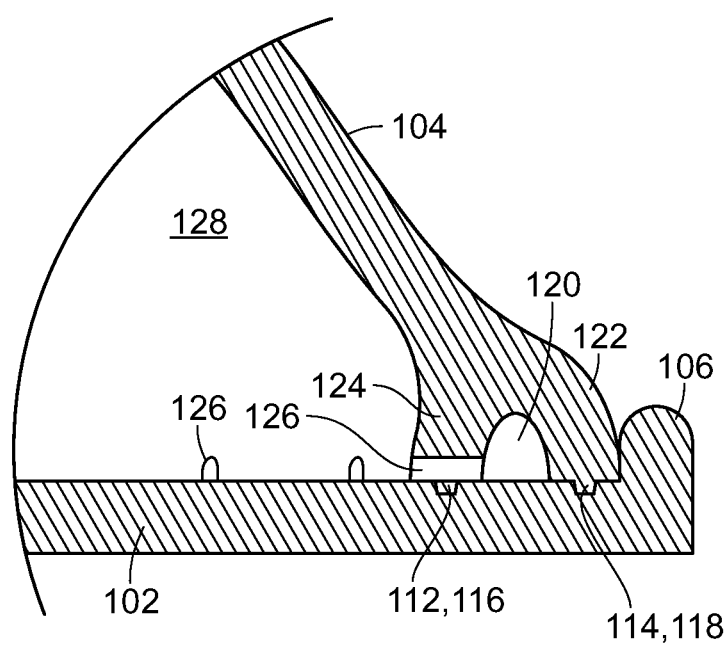
FIG. 4 is a cross-sectional view similar to FIG. 3, but illustrating the wall and the base connected to one another.

With reference now to FIGS. 3 and 4, a lower peripheral edge of the wall 104 is attachable to the base 102. In the illustrated embodiment, near the peripheral lip 106 of the base, are formed grooves 112 and 114 which are concentric to one another and sized and configured so as to receive nibs or protrusions 116 and 118 at the bottom of the lower edge of the wall 104, as illustrated in FIGS. 3 and 4.

With continuing reference to FIGS. 3 and 4, a channel 120 is formed in the wall 104 which serves as an air conduit for pressurized air, such as from the pump 14. In a particularly preferred embodiment, as illustrated, the channel 120 is an open-faced channel formed in the bottom peripheral edge of the wall 104, between an outer peripheral edge and an inner peripheral edge 122 and 124 which are spaced apart from another and have a generally U-shaped cross-sectional configuration to form the open-faced channel 120.

When the wall 104 is connected to the base 102, such as by inserting protrusions 116 and 118 into grooves 112 and 114, and forming a waterproof and sealed connection therebetween, such as by sonic welding, adhesives or the like, the base closes off the open-face channel 120 to form an integrally formed air conduit at the junction between the base 102 and the wall 104. Apertures or passageways 126 are formed in the wall 104, such as through the inner peripheral edge 124 of the wall which extend to air channel or conduit 120 to form air outlets which are directed into the reservoir 128. These air outlets 126 are formed within the wall 104 in a spaced-apart relationship, so as to provide pressurized air into the water within the reservoir 128 so as to aerate the water, as illustrated in FIG. 6.

With reference now to FIGS. 5 and 6, an air inlet nipple 130 extends from the bowl 100 for connection to the airline 12 for supplying pressurized air into the air conduit, and thus into the water within the reservoir 128. The air inlet nipple 130 is in fluid communication with the air conduit or channel 120. As illustrated in FIG. 2, the air nipple 130 may be comprised of pieces 130A extending from the base 102 and 130B extending from the wall 104, which when brought together cooperatively form the air inlet nipple 130, having an open-ended air passageway, which extends into the air conduit channel 120 so as to supply air into the air conduit 120 and through the air outlet apertures 126.

It will be understood that forming the air inlet nipple 130 and the air conduit 120 integrally with the bowl 100, such as at the junction between the base 102 and the wall 104, as illustrated and described above, is a convenient and inexpensive way of supplying the pressurized air to the water within the reservoir 128, although the invention contemplates other means for supplying pressurized air into the reservoir to accomplish the objectives of the present invention. For example, the air conduit 120 could be formed entirely within the base 120, or entirely within the wall 104. Instead of the air conduit being integrally formed with the bowl 100, a separate air conduit, such as tubing with spaced apart air outlet apertures, could be incorporated into the bowl 100 of the present invention.

With reference now to FIG. 6, an important aspect of the present invention is that pressurized air is introduced into the water within the reservoir 128, such as by means of through air inlet nipple 130 and into channel or air conduit 120, and out air outlet apertures 126 so as to aerate the water within the reservoir 128 and create a water mist 132. Aeration of the water prevents it from becoming stagnant. It has also been found that the constant aeration or bubbling action of the water within the reservoir 128 discourages insects, such as crickets, from entering into the reservoir and becoming trapped in the drinking water supply. Thus, the watering bowl 100 will need to be filled, and only periodically refilled as needed. Aerating the water within the reservoir 128 also creates mist 132 which can collect at the rim 108 and on an outer surface of the wall 104. This enables small animals, such as certain lizards, such as chameleons, to lap up the droplets of water formed by the mist 132 on the outer surface 104 of the bowl 100 and/or the rim 108 of the opening 110. This sufficiently mimics the small dew droplets on plants and grass which these lizards and other small animals might otherwise drink from, but refuse to drink from standing water.

As shown in the various figures, including FIGS. 5 and 6, the bowl opening 110 is smaller in diameter than the base 102. This is due to the tapering of the wall 104 from the base 102 to the rim 108 defining the opening 110. The opening 110 may be generally centered with respect to the base 102. This arrangement provides for a very stable watering bowl 100 which will not be easily tipped over or spill. In fact, the watering bowl 100 of the present invention is practically spill-proof in normal use.

Although the watering bowl 100 is shown as being generally circular in shape, which is a particularly preferred configuration, other configurations are contemplated by the present invention. For example, the bowl may have two flat sides being at an approximate ninety-degree angle between the wall and the base, allowing the bowl to be placed in a corner of the enclosure. Such a configuration will still achieve the benefits of the present invention by providing a sloped outer wall surface while minimizing the amount of space which the bowl occupies in the enclosure.

The watering bowl 100 is particularly adapted and suited for lizards and other small animals. In such use, the overall height of the watering bowl 100 may be approximately between two and four inches. The base 102 may be between five inches to eight inches in diameter. Opening 110 of wall 104 may be between two inches to five inches in diameter. The air inlet nipple may have an outside diameter of approximately 3/16" and an inside dimeter of approximately 1/8" and a length of approximately 1/2" which would accommodate use of a common 5/16" aquarium airline tubing over the male external air supply line nipple 130. It will be appreciated, however, that such dimensions are merely illustrative and exemplary.

As mentioned above, the external surface of the wall 104 may be textured, such as with a stone or sand-type grain. Such coarse surface, as well as the tapering angle of the wall 104 allows small animals to obtain sure footing, ensuring them easy access to the water within the bowl 100, or water which is collected at the rim 108, or even water droplets on the outer surface of the wall 104 so that they can drink, even if they are animals, such as chameleons or other small lizards, which only drink from small droplets of water on a surface, as described above.

Although several embodiments have been described in detail for purposes of illustration, various modifications may be made without departing from the scope and spirit of the invention. Accordingly, the invention is not to be limited, except as by the appended claims.

What is claimed is:

1. A watering bowl for small animals, comprising:
   a reservoir having a base and a wall extending from the base to an opening, wherein the opening has a diameter that is smaller than the base; and
   an air conduit for conveying pressurized air into the reservoir and aerating water within the reservoir to create a mist that rises to the opening and then on an outer surface of the bowl.
2. The watering bowl of claim 1, wherein an outer surface of the wall is coarse, tiered, or undulating.
3. The watering bowl of claim 2, wherein the wall is tapered between the base and the opening.
4. The watering bowl of claim 3, wherein the wall extends upwardly from the base to the opening at an angle between 30 and 60 degrees.
5. The watering bowl of claim 1, wherein the opening is generally centered over the base.
6. The watering bowl of claim 1, wherein the air conduit includes a plurality of spaced apart air outlets formed within the reservoir.
7. The watering bowl of claim 1, wherein the air conduit includes an air nipple extending outwardly from the base.
8. The watering bowl of claim 1, 6 or 7, wherein the air conduit is formed integrally with the bowl.
9. The watering bowl of claim 8, wherein the air conduit is formed in the wall.
10. The watering bowl of claim 8, wherein the air conduit is formed at a junction between the wall and the base.
11. A watering bowl for small animals, comprising:
    a reservoir having a base and a tapered wall that extends from the base to an opening that has a diameter that is smaller than the base;
    an air conduit, including an air inlet nipple, formed integrally with the bowl for conveying pressurized air into the reservoir and aerating water within the reservoir to create a mist that rises to the opening and then on an outer surface of the bowl.
12. The watering bowl of claim 11, wherein an outer surface of the wall is coarse.
13. The watering bowl of claim 11, wherein the wall extends upwardly from the base to the opening at an angle between 30 and 60 degrees.
14. The watering bowl of claim 11, wherein the opening is generally centered over the base.
15. The watering bowl of claim 11, wherein the air conduit includes a plurality of spaced apart air outlets formed within the reservoir.
16. The watering bowl of claim 11, wherein the air conduit is formed at a junction between the wall and the base.

* * * * *